United States Patent [19]
Takada et al.

[11] Patent Number: 5,626,348
[45] Date of Patent: May 6, 1997

[54] METAL GASKET

[75] Inventors: Kazukuni Takada, Ibaragi; Kenji Kubouchi, Hirakata; Kunitoshi Inoue, Higashiosaka; Tadayoshi Akutsu, Fujisawa; Masahiko Miura, Kawachinagano, all of Japan

[73] Assignee: Nippon Gasket Co., Ltd., Osaka-fu, Japan

[21] Appl. No.: 591,690

[22] Filed: Jan. 25, 1996

[30] Foreign Application Priority Data

Feb. 6, 1995 [JP] Japan ................... 7-039451

[51] Int. Cl.⁶ ................................................. F16J 15/08
[52] U.S. Cl. ........................................ 277/180; 277/235 B
[58] Field of Search ........................ 277/180, 235 B, 277/236

[56] References Cited

U.S. PATENT DOCUMENTS

| | | | |
|---|---|---|---|
| 5,076,595 | 12/1991 | Udagawa | 277/235 B |
| 5,205,566 | 4/1993 | Ueta et al. | |
| 5,211,408 | 5/1993 | Udagawa | 277/235 B |
| 5,232,229 | 8/1993 | Udagawa | 277/235 B |
| 5,286,039 | 2/1994 | Kawaguchi et al. | 277/235 B |
| 5,439,234 | 8/1995 | Udagawa | 277/235 B |
| 5,522,604 | 6/1996 | Weiss et al. | 277/235 B |

FOREIGN PATENT DOCUMENTS

| | | | |
|---|---|---|---|
| 0306766 | 3/1989 | European Pat. Off. . | |
| 0486150 | 5/1992 | European Pat. Off. . | |
| 1142477 | 1/1963 | Germany | 277/235 B |
| 255253 | 11/1986 | Japan | 277/235 B |
| 63-293363 | 11/1988 | Japan . | |
| 64-65367 | 3/1989 | Japan . | |
| 134376 | 6/1991 | Japan | 277/235 B |

*Primary Examiner*—Scott Cummings
*Attorney, Agent, or Firm*—Browdy and Neimark

[57] ABSTRACT

The metal gasket according to the present invention is formed by bead base plates comprising elastic metal plates having beads and auxiliary beads along the circumferences of holes, and an intermediate plate interposed between these bead base plates. The stoppers and stepped portions formed on the intermediate plate prevent the total compression of the beads on the bead base plates when the metal gasket is tightened, and enable the irregularity of the opposed surfaces of a cylinder head and a cylinder block to be offset. The auxiliary beads provided on the bead base plates display the sealing performance with respect to the beads and minimize the dead spaces around the holes.

9 Claims, 4 Drawing Sheets

METAL GASKET

BACKGROUND OF THE INVENTION

1. Field of the Invention

This invention relates to a metal gasket used to seal a narrow space between opposed surfaces in a multi-cylinder engine and formed by interposing an intermediate plate between bead base plates comprising two elastic metal plates provided with beads along holes.

1. Description of the Prior Art

The structural members of an existing engine, such as a cylinder head and a cylinder block which are made of an aluminum alloy have small weight but a low rigidity, so that, while the engine is operated, the relative displacement occurring between these structural members tends to become large. Therefore, a metal gasket sealing a narrow space between the opposed surfaces of the two structural members is made of a metal material provided with beads on the portions thereof which are in the vicinity of the circumferences of through holes therein which are made correspondingly to cylinder bores, i.e. combustion chambers, and passages for water and oil.

A conventional metal gasket disclosed in Japanese Patent Laid-Open No. 293363/1988 is as shown in FIG. 10 disposed between a cylinder head 15 and a cylinder block 16, and includes two bead base plates 21, 22 comprising elastic metal plates on which annular beads 23, 24 are formed along the circumferences of combustion chamber holes 20, two intermediate plates 25, 26 disposed between the bead base plates, and spacer members 27 disposed between the intermediate plates 25, 26. In this metal gasket, the spacer members 27 are held between the regions of the two intermediate plates 25, 26 which are closer to the combustion chamber holes 20 than to the regions thereof which contact the beads 23, 24. Accordingly, one additional engaged surface exists between the two intermediate plates 25, 26 due to the provision of the spacer members 27. Moreover, the spacer members 27 have to be fixed by welding, and this causes the processing cost to increase, the increasing of the accuracy of the thickness of compensating portions to be substantially hampered, and the sealability of the metal gasket to decrease.

The metal gasket disclosed in Japanese Patent Laid-Open No. 65367/1989 is formed as shown in FIG. 11 by laminating two intermediate plates 35, 36 between two bead base plates 31, 32 comprising elastic metal plates on which annular beads 33, 34 the ridge portions of which are opposed to each other are formed along the circumferences of combustion chamber holes 30, and embracing a combustion chamber hole-side edge portion 37 of one intermediate plate 35 in that 38 of the other intermediate plate 36 so as to form a grommet-like structure and provide stepped portion on both surfaces of the intermediate plates, whereby a bent portion 39 for offsetting the irregularity of a narrow clearance between two opposed fixing surfaces. In this metal gasket, an edge portion 37 of one intermediate plate 35 is embraced in a grommet-like structure in an opposed edge portion 38 of the other intermediate plate 36, and substantially identical stepped portions are formed on both surfaces of the intermediate plates 35, 36. When the intermediate plates are held between the bead base plates 31, 32 on both sides thereof and compressed in a fully buckled state between the cylinder head 15 and the cylinder block 16, the grommet-like embraced folded portion comes to work as a shim for the beads 33, 34, and the stress amplitude of the bead base plates 31, 32 decreases. However, due to a difference between the operations of the upper and lower bead base plates 31, 32, bending stress and stress amplitude occur in the folded portion. Consequently, cracks and permanent set in fatigue occur in the bent portion 39 as well as in the bead base plates 31, 32.

In the conventional metal gaskets, the compensating portion in the circumferential edge of a combustion chamber hole and having the function of preventing the total compression of the beads on the two bead base plates, and the function of offsetting the irregularity of the opposed fixing surfaces occurring in a gasket tightening operation requires two intermediate plates basically. The compensating portion mentioned above is formed by using an additional member, such as a spacer or by a folded portion formed on the metal plates constituting the intermediate plates, so that increased manufacturing steps and quality control are required. This necessarily causes the manufacturing cost to increase.

SUMMARY OF THE INVENTION

An object of the present invention is to solve these problems, and provide a metal gasket including a pair of bead base plates comprising bead-carrying elastic metal plates, and an intermediate plate disposed between the bead base plates, at least one bead base plate being provided with auxiliary beads on the inner side of primary beads thereon so that the auxiliary beads serve to improve the sealability of the metal gasket, prevent a gas from entering the insides of the beads on the bead base plates and the stoppers on the intermediate plate, whereby the occurrence of the permanent set in fatigue of the beads and stoppers is prevented, minimize a dead space, and offset the irregularity between the deck surfaces.

This metal gasket has a pair of bead base plates comprising elastic metal plates on which beads are formed along the circumferences of parallel-arranged holes, such as combustion chamber holes, and an intermediate plate disposed between the bead base plates disposed with the beads thereon opposed to each other, the thickness of the intermediate plate being set around 3–5 times as large as that of the bead base plates, at least one of the bead base plates being provided with auxiliary beads along the portions thereof which are closer to the holes than to the primary beads so that the auxiliary beads project in the same direction as and to a height less than that of the primary beads.

Since the auxiliary beads are provided as mentioned above on the bead base plates in this metal gasket, they can minimize the dead spaces formed between the bead base plates and intermediate plate and around the holes corresponding to the combustion chambers. The auxiliary beads also have the functions of stoppers with respect to the compression of the primary beads, and are capable of preventing the entry of a gas into the insides of the beads on the bead base plates, and the occurrence of permanent set in fatigue of the beads which is ascribed to the corrosion thereof due to a gas. Namely, the auxiliary beads can function as stoppers, aid the bead compressing operation and prevent the occurrence of permanent set in fatigue of the beads. The providing of the auxiliary beads on the bead base plates enables the use of two intermediate plates to become unnecessary, a total number of laminated plates in the metal gasket to be reduced, and the number of parts of the metal gasket to be reduced.

In this metal gasket, the intermediate plate is provided with stoppers along at least the inner sides of the beads so that the stoppers project toward one of the bead base plates to a height less than that of the beads. The height of the stoppers is also smaller than that of the auxiliary beads. The auxiliary beads on the bead base plates are formed along the portions thereof which are on the inner sides of these stoppers.

In this metal gasket, the total compression of the beads on the bead base plates is prevented by the stoppers on the single intermediate plate, whereby the bead base plates are protected. These stoppers enable the sealability thereof with respect to the beads to be secured, the functions of the beads to be displayed properly at all times, the bead sealing function of the stoppers to be fulfilled, the durability of the beads to be improved, the spacer members used in a conventional metal gasket to be omitted, the number of parts to be reduced, and the metal gasket to be manufactured at a low cost with improved reliability. Since it is unnecessary to form folded portions on the intermediate plate, the intermediate plate does not encounter the occurrence of stress which occurs in bent portions, and cracks do not occur in the intermediate plate, so that the durability of the intermediate plate can be improved. The height of the stoppers can be set variously depending upon that of the beads, and the degree of prevention of total compression of the beads and the sealability thereof can be set properly.

As mentioned above, the stoppers can prevent the entry of a gas into the insides of the beads and the occurrence of permanent set in fatigue of and cracks in the beads. Since the auxiliary beads are formed along the portions of the intermediate plate which are on the inner sides of the stoppers, they can prevent the entry of a gas into the inner sides of the beads on the bead base plates and the inner sides of the stoppers on the intermediate plate, and the occurrence of permanent set in fatigue of the beads reliably.

Therefore, if the auxiliary beads are provided on the surfaces of the two bead base plates in this metal gasket which are opposed to the single intermediate plate which the beads contact, it becomes possible to prevent the complete compression of the beads owing to the auxiliary beads. The intermediate plate is provided with compensating portions having the function of offsetting the irregularity of the opposed surfaces and the sealing function for protecting the beads whereby the permanent set in fatigue of the beads and cracks therein, which occur when the beads are overcompressed, can be prevented. Owing to the stoppers mentioned above, the entry of a combustion gas into the inner sides of the beads is prevented to protect the beads against corrosion due to the high-temperature gas and prevent the lowering of the function of the beads. Namely, the stoppers constitute compensating portions formed annularly along the holes, preventing the total compression of the beads against the bead base plates and improving the sealability of the metal gasket.

In the metal gasket, the intermediate plate is provided at the parts thereof which are on the inner sides of the stoppers with stepped portions extending in the direction opposite to the direction in which the stoppers project. The bead base plate, toward which the stepped portions formed on the intermediate plate project, is not provided with auxiliary beads, i.e., the corresponding portions of this bead base plate have flat surfaces. Therefore, in this metal gasket, the annular portions closer to the holes than to the stepped portions constitute compensating portions preventing the total compression of the beads against the other bead base plate and improving the sealability of the metal gasket. Accordingly, the bead base plates are not necessarily provided with the auxiliary beads. When the stepped portions are formed on the intermediate plate, the stepped portions display performance similar to that of the auxiliary beads. Consequently, dead spaces formed between the bead base plates and intermediate plate can be more reduced, and the sealability of the metal gasket is improved.

In this metal gasket, at least the surfaces of the bead base plates which are on the opposite sides of the intermediate plate are coated with a nonmetallic layer. Both surfaces of the intermediate plate are also coated with a non-metallic layer.

In this metal gasket, compensating portions are formed on the intermediate plate, and additional members, such as spacers are not used. Namely, it is not necessary to manufacture additional members, and the metal gasket can be formed by only a pair of bead base plates and one intermediate plate, so that the number of parts and manufacturing steps can be reduced. Since this metal gasket has a simple shape, it is possible to not only reduce the manufacturing cost to a great extent but also improve the part machining precision, reduce the accumulated error, control the height of the stoppers more easily, improve the sealing performance of the metal gasket owing to a decrease in the number of layers thereof and provide a highly reliable product. The stoppers on the intermediate plate can be provided on the side thereof which is opposed to the cylinder head or cylinder block, or on the sides thereof which are opposed to both of them when the metal gasket is set practically.

In this metal gasket, the intermediate plate constitutes compensating portions, so that folded portions may not be formed. The folded portions are not provided either at the hole-side edges of the bead base plates. Accordingly, it is unnecessary to use the step of forming folded portions and take measures for preventing the occurrence of cracks therein. This enables the gasket manufacturing cost to be reduced.

In this metal gasket, the height of the auxiliary beads on the bead base plates, the stoppers or stepped portions on the surface of the intermediate plate can be set arbitrarily to suitable levels. Therefore, the surface pressure balance of the two bead base plates with respect to the opposed fixing surfaces can be changed suitably. This allows the stress fluctuation of the bead base plates and the bending stress imparted to the compensating portions to be set in accordance with, for example, the condition of a case where the properties of the bead base plates are different. As a result, the breakage of the beads on the bead base plates and the compensating portions and a decrease in the sealing effect can be prevented, and a stable sealing effect can be displayed.

DETAILED DESCRIPTION OF THE PREFERRED EMBODIMENTS

Figure 1:
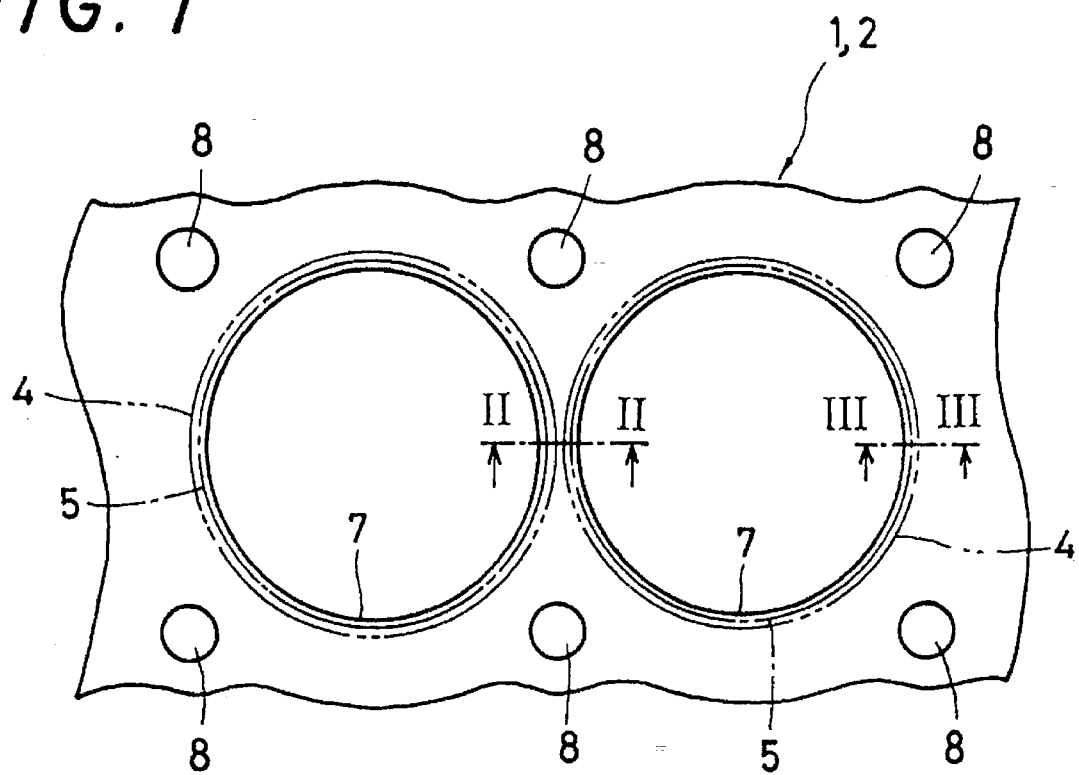
FIG. 1 is a partial plan view showing an example of a bead base plate to be incorporated in the metal gasket according to the present invention.

An embodiment of the metal gasket according to the present invention will now be described with reference to FIG. 1–6. In the drawings showing embodiments which will be described later, parts and portions having the same construction and function are designated by the same reference numerals, and the duplication of descriptions thereof is omitted. In the following embodiments, head gaskets will be described.

Figure 5:
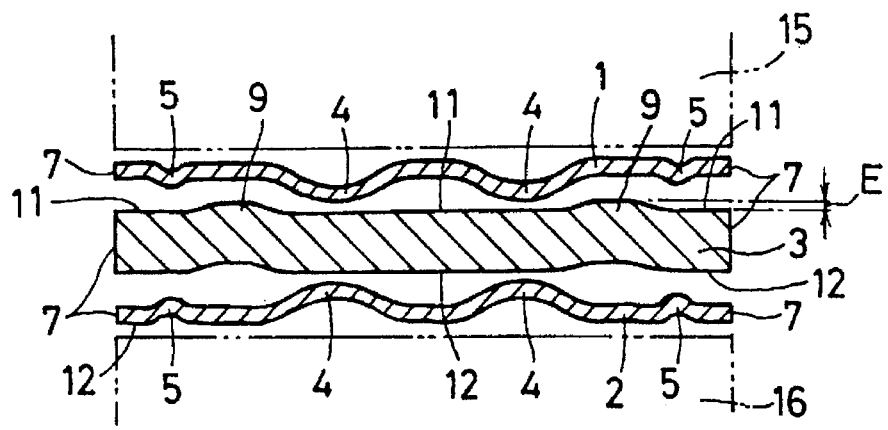
FIG. 5 is an enlarged section taken along the line V—V on the metal gasket of FIG. 4.
Figure 6:
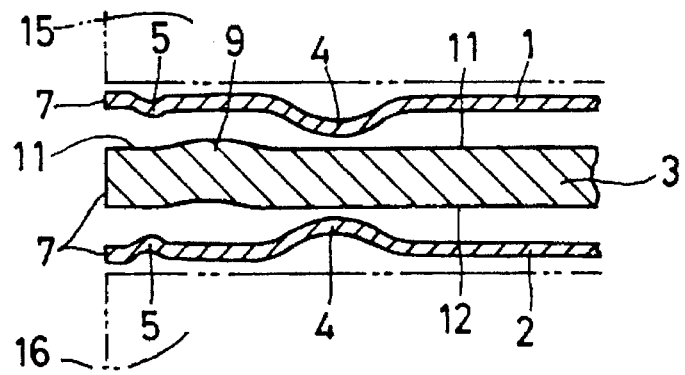
FIG. 6 is an enlarged section taken along the line VI—VI on the metal gasket of FIG. 4.

The metal gasket according to the present invention is held between a cylinder head 15 and a cylinder block 16 or between the cylinder head 15 and an exhaust manifold (not shown) as shown in, for example, FIGS. 5 and 6, to seal a clearance between the opposed fixing surfaces. This metal gasket is provided with combustion chamber holes, i.e. holes 7 corresponding to cylinder bores formed in the cylinder block 16, or holes (not shown) corresponding to exhaust passages in the exhaust manifold. This metal gasket is provided with a plurality of holes 7 in a parallel-arranged state so that the metal gasket can be applied to a multi-cylinder engine, such as a 4- cylinder engine and a 6-cylinder engine.

Figure 2:
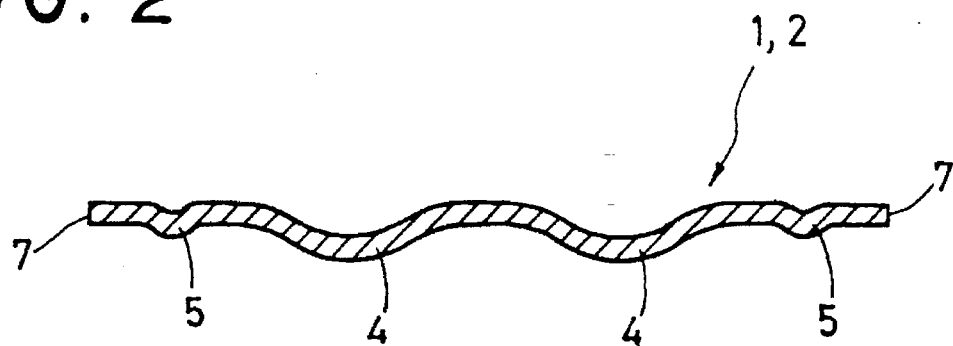
FIG. 2 is an enlarged section taken along the line II—II on the bead base plate of FIG. 1.
Figure 3:
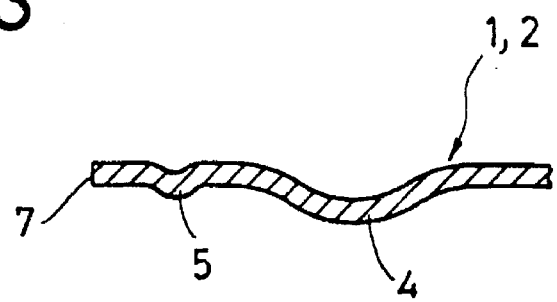
FIG. 3 is an enlarged section taken along the line III—III on the bead base plate of FIG. 1.

Bead base plates 1, 2 constituting the metal gasket according to present invention will be described with reference to FIGS. 1, 2 and 3.

The bead base plates 1, 2 are formed by elastic metal plates having holes 7 corresponding to a multi-cylinder engine. The bead base plates 1, 2 are provided around the holes 7 with a plurality of holes, such as cooling water holes (not shown) and oil holes (not shown) besides bolt holes 8. Cross-sectionally projecting beads 4 are formed on the bead base plates 1, 2 so as to extend circularly along and substantially concentrically with the holes 7. The beads 4 are formed by opposing projecting portions of the same shape on different bead base plates. The distance between adjacent holes 7 formed in the bead base plates 1, 2 is set to, for example, about 6.00 mm, the thickness of each of the two bead base plates 0.2–0.3 mm, the width of each bead 4 measured in the radial direction thereof about 2.5 mm, and the height of each bead 4 0.27 mm. Especially, the annular regions of the bead base plates 1, 2 which are closer to the holes 7 than to the beads 4, are provided with auxiliary beads 5 projecting in the direction, in which the beads 4 project, to a height smaller than that of the beads 4.

Figure 4:
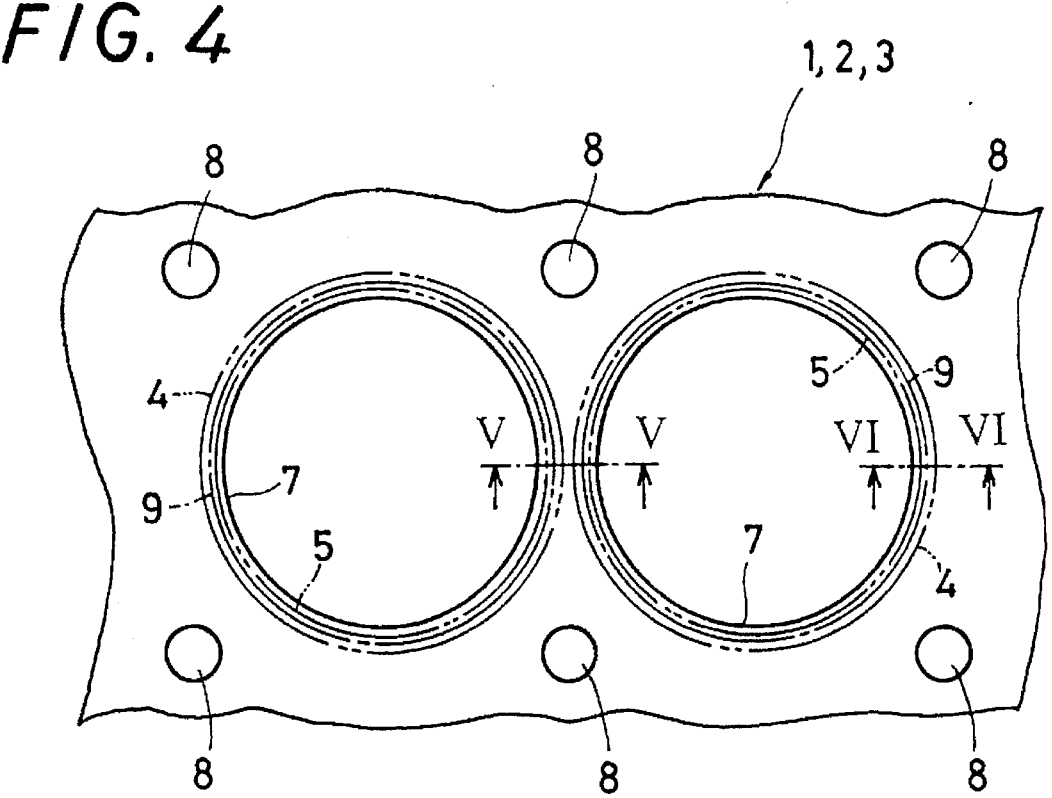
FIG. 4 is a partial plan view showing an embodiment of the metal gasket according to the present invention.

An embodiment of the metal gasket according to the present invention will now be described with reference to FIGS. 4, 5 and 6.

This metal gasket is formed by laminating a pair of bead base plates 1, 2, and an intermediate plate 3 having a thickness larger than that of the bead base plates 1, 2 and interposed between the same plates 1, 2. The intermediate plate 3 is provided around the holes 7 with a plurality of holes, such as cooling water holes (not shown) and oil holes (not shown) besides bolt holes 8 in the same manner as the bead base plates 1, 2. Namely, the bead base plates 1, 2 and intermediate plate 3 are provided with holes 7 and bolt holes 8 in the same positions, each kind of holes being basically similar to each other. The beads 4 on the bead base plates 1, 2 are formed so as to be opposed at their projecting portions to each other, so that, when the three plates are laminated and held between the cylinder head 15 and cylinder block 16, the beads 4 contact each of the surfaces 11, 12 of the intermediate plate 3.

The intermediate plate 3 is provided on the regions thereof which are on the sides of the holes 7 and closer to the beads 4 than to the surface portions 11 thereof contacting the beads 4 with stoppers 9 comprising projections extending toward one bead base plate 1 to a height E smaller than that of the beads 4 and the thickness of the intermediate plate 3, in such a manner that the stoppers 9 extend so as to surround the holes 7 annularly. The stoppers 9 are formed on the intermediate plate 3 by sheet metal work, and recesses in the opposite surface 12 of the intermediate plate 3. The thickness of the intermediate plate 3 is set 3–5 times as large as that of the bead base plates 1, 2. The auxiliary beads 5 on the bead plates 1, 2 have a height larger than that of the stoppers 9 on the intermediate plate 3, and are positioned closer to the holes 7 than to the stoppers 9 and on the inner sides of the holes 7. Namely, the stoppers 9 are formed to a height smaller than that of the auxiliary beads 5. The stoppers 9 on the intermediate plate 3 are provided on the portions thereof which correspond to at least the regions of the bead base plates which extend along the inner sides of the beads so that the stoppers project toward one bead base plate 1 to a height smaller than that of the beads 4. The auxiliary beads 5 are positioned on the regions extending along the inner sides of the stoppers 9 on the intermediate plate 3.

Figure 9:
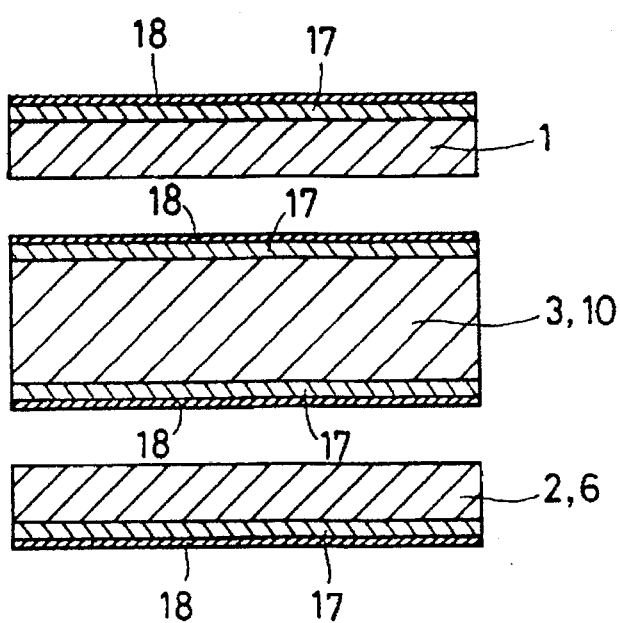
FIG. 9 is a partial exploded view for explaining the bead base plates and intermediate plate in this metal gasket.
Figure 10:
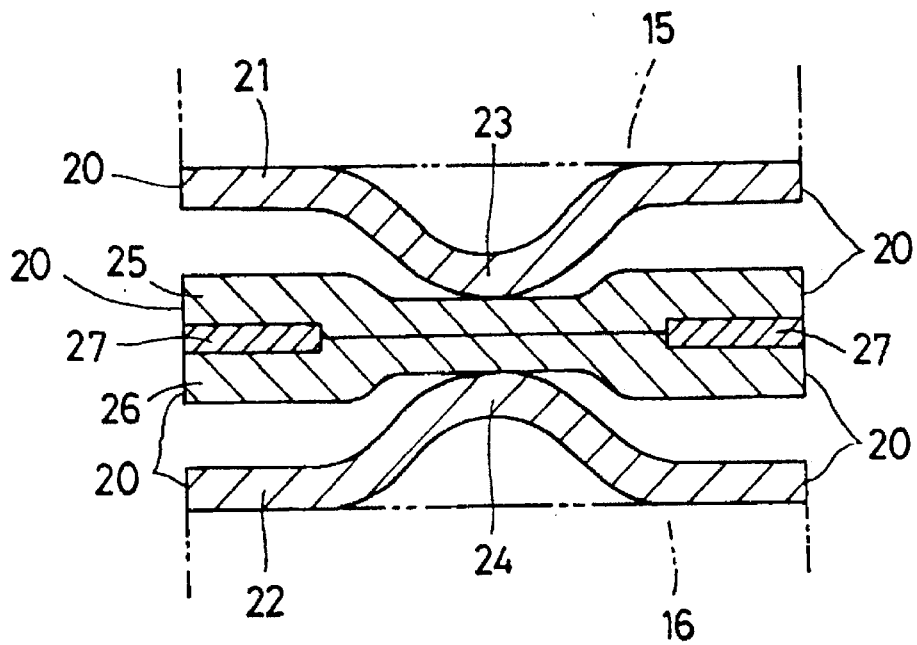
FIG. 10 is a sectional view showing a conventional metal gasket.
Figure 11:
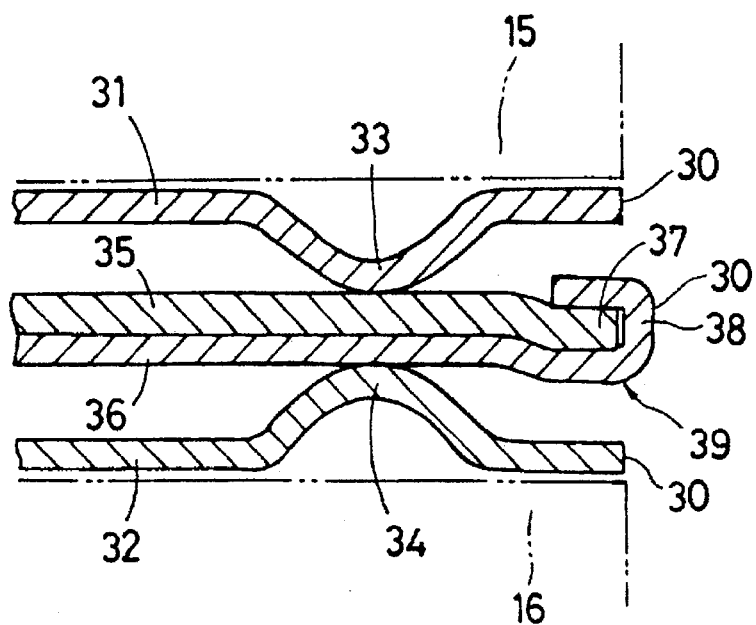
FIG. 11 is a sectional view showing another conventional metal gasket.

In this metal gasket, the intermediate plate 3 is formed out of a metal softer than that of a metal of which are bead base plates 1, 2 are made. For example, the bead base plates 1, 2 are formed out of SUS301, and the intermediate plate, which constitutes a regulating plate, SECC (soft steel plate). As shown in FIG. 9, the surfaces of elastic metal plates forming the bead base plates 1, 2 are coated with a heat- and oil-resisting non-metallic layer of, for example, around 10–50 μm in thickness, whereby a metal-to-metal contacting condition is avoided with respect to the cylinder head and cylinder block. Thus, the corrosion resistance, durability and strength of the metal gasket are secured. For example, the upper surface of the bead base plate 1, the lower surface of the bead base plate 2 and both surfaces of the intermediate plate 3 are coated with fluororubber 17 having heat- and oil-resistance and the outer surfaces of the fluororubber 17 an acrylic silicone resin 18. Even if the surfaces of the bead base plates 1, 2 and intermediate plate 3 have projections and recesses occurring while they are machined, the non-metallic layers formed thereon cover the projections and recesses, so that the metal gasket can fulfill its sufficient sealing function.

In this embodiment, the thickness of the intermediate plate 3 is set around 3–5 times as large as that of the bead base plates 1, 2. For example, the thickness of the bead base plates 1, 2 can be set to 0.2–0.3 mm, and that of the intermediate plate 0.50–0.8 mm. The height of the stoppers 9 formed on the intermediate plate 3 is set to 30–60 μm, and that of the beads 4 on the bead base plates 1, 2 0.20–0.25 mm. The height of the auxiliary beads 5 is set between those of the stoppers 9 beads 4.

Figure 7:
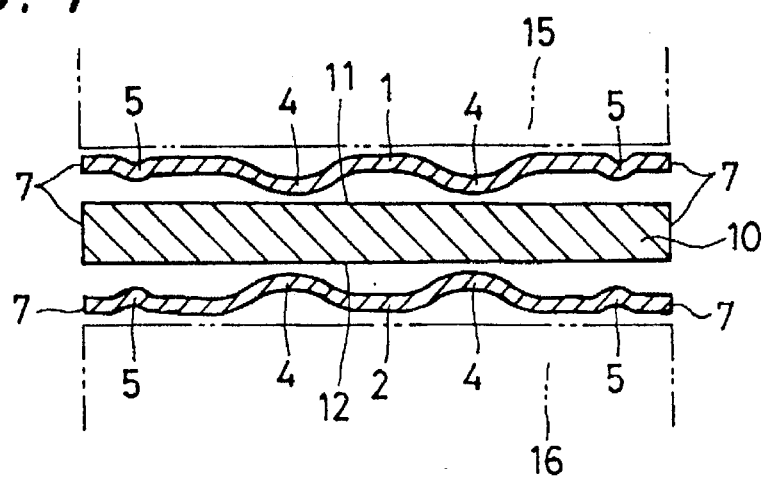
FIG. 7 is an enlarged section of the portion of another embodiment of the metal gasket according to the present invention which corresponds to the portion of the line V—V on the metal gasket of FIG. 4.

Another embodiment of the metal gasket according to the present invention will now be described with reference to FIG. 7. FIG. 7 is an enlarged section of a region between holes 7 which corresponds to the region taken along the line V—V in FIG. 4. The embodiment of FIG. 7 has completely the same construction as the above-described embodiment except that stoppers are not formed on an intermediate plate 10. In the embodiment of FIG. 7, the intermediate plate is a flat surface-pressure regulating plate with no stoppers 9 formed thereon, so that only auxiliary beads 5 on the bead base plate 1 constitute seal portions for the beads 4, especially, on the same bead base plate 1 which is on the side of the cylinder head 15. Therefore, the sealability of the metal gasket decreases but it still provides a sufficient sealing to a certain type of engine. This metal gasket can secure the advantage that the cost of manufacturing the intermediate plate 10 can be reduced.

Still another embodiment of the metal gasket according to the present invention will now be described with reference to FIG. 8. This embodiment has completely the same construction as the first embodiment except that stepped portions are formed in addition to the stoppers. In the metal gasket of the embodiment of FIG. 8, the intermediate plate 3 is provided on the regions thereof which are closer to holes 7 than to stoppers 9 with stepped portions 13 extending in the direction opposite to the direction in which the stoppers 9 project. A bead base plate 6 positioned on the side of the stepped portions 13 formed on the intermediate plate 3 is not provided with auxiliary beads but formed so as to have a flat surface 19. The bead base plate 6 has the same construction as the bead base plate 1 except that auxiliary beads are not formed thereon.

The bead base plate 6 is disposed on the side of the cylinder block 16. In side of the fact that the bead base plate 6 is not provided with auxiliary beads, a sufficient sealability thereof can be displayed with respect to the beads 4 since the intermediate plate 3 has stepped portions 13 on the sides of the holes 7, which stepped portions 13 fulfill the function of the auxiliary beads of the above-described embodiments.

Figure 8:
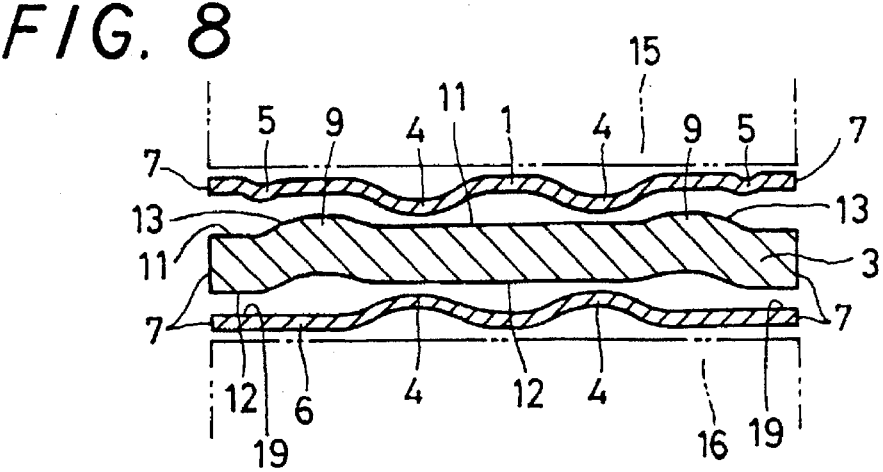
FIG. 8 is an enlarged section of the portion of still another embodiment of the metal gasket according to the present invention which corresponds to the portion of the line V—V on the metal gasket of FIG. 4.

In the embodiment of FIG. 8, the height of the stoppers 9 on the intermediate plate 3 is set smaller than that of the beads 4 on the bead base plate 1, while the height of the auxiliary beads 5 formed on the bead base plate 1 is set larger than that of the stepped portions 13 formed on the intermediate plate 3. For example, the thickness of the intermediate plate 3 is set to 0.5–1.0 mm which is 3–5 times as large as that of the bead base plates 1, 2. The height of the stoppers 9 is set to 0.04–0.15 mm, and that of the stepped portions 13 0.08–0.15 mm, preferably two times that of the stoppers 9.

In this embodiment, the intermediate plate 3 is provided on the regions thereof which are on the sides of the holes 7 and closer to the beads 4 than to the surface portions 11 thereof contacting the beads 4 with stoppers 9 extending toward one bead base plate 1 to a height E smaller than that of the beads 4 and the thickness of the intermediate plate 3, in such a manner that the stoppers 9 extend so as to surround the holes 7 annularly. Since the stoppers 9 are formed on the intermediate plate 3 by sheet metal work, recesses are formed in the opposite surface 12 thereof. At the parts of the intermediate plate 3 which are between the stoppers 9 and holes 7, stoppers comprising stepped portions 13, which have a height larger than that of the stoppers 9 but smaller than the sum of the heights of each of the stoppers 9 and each of the beads 4, are formed so as to extend toward the other bead base plate 6 and extend annularly along the holes 7. The other surface 12 of the intermediate plate 3 is provided with recesses formed in the same manner as in the case of the stoppers 9. As a result, the stoppers 9 of the intermediate plate 3 form compensating portions for the bead plate 1, and the stepped portions 13 thereof compensating portions for the bead base plate 6.

Although the metal gasket according to the present invention can be formed to the structures of these embodiments, it is not limited to them. For example, the top surfaces of the stoppers formed on the intermediate plate may be projected, or made so as to have flat surfaces. The stoppers may meet an adjacent stopper in a region between the holes, or may be formed independently of each other. The stoppers can be changed in shape in regions along the holes. The beads formed on the bead base plates may meet an adjacent bead in a region between the holes, or may be formed independently of each other. When the beads formed on the bead base plates are independent of each other in the regions between the holes, auxiliary stoppers can be formed on the regions which correspond to area between the beads on the intermediate plate 3. The stoppers on the intermediate plate can be provided locally taking the positions of bolts, which are used to tighten the metal Gasket, into consideration without extending them along the whole circumferences of the holes. The stoppers can be formed on the intermediate plate to a uniform height. This height may be varied in a certain case depending upon the area of the regions around the holes, and in accordance with the possibility of deformation of an engine, for example, the deformation of the fixing surfaces of the cylinder head and cylinder block, or the fixing surfaces of the cylinder head and exhaust manifold, or the deformation of an engine due to the heat and explosion occurring during an operation thereof. The stoppers can also be formed continuously along the holes, or partially or intermittently along the holes. The stoppers can be formed to annular projections, arcuate projections or circular projections.

What is claimed is:

1. A metal gasket comprising:

a pair of bead base plates comprising elastic metal plates provided with beads along the circumferences of parallel-arranged holes, said beads on said bead base plates being disposed so as to be opposed to each other, and an intermediate plate interposed between said bead base plates, a constant intermediate plate thickness of said intermediate plate being three to five times as large as a base plate thickness of said bead base plates, said intermediate plate including stoppers on inner sides of said beads and along circumferences of said holes, at least one of said bead base plates being provided with auxiliary beads formed on inner sides of said beads and along the circumferences of said holes so as to project in the same direction as said beads and have a height smaller than that of said beads.

2. The metal gasket according to claim 1, wherein said stoppers project toward at least one of said bead base plates to a height smaller than that of said beads, the height of said stoppers being set smaller than that of said auxiliary beads, said auxiliary beads being formed on inner sides of said stoppers on said intermediate plate and along the circumferences of said holes.

3. The metal gasket according to claim 1, wherein said stoppers formed in said intermediate plate are provided with stepped portions along the circumferences of said holes and on inner sides of said stoppers so that said stepped portions project in the direction opposite to the direction in which said stoppers project, toward the other bead base plate.

4. The metal gasket according to claim 3, wherein said bead base plate positioned on the side toward which said stepped portions formed on said intermediate plate project has a flat surface without being provided with said auxiliary beads.

5. The metal gasket according to claim 1, wherein at least the surfaces of said bead base plates which are on the opposite sides of said intermediate plate are coated with a non-metallic layer.

6. The metal gasket according to claim 1, wherein both surfaces of said intermediate plate are coated with a non-metallic layer.

7. The metal gasket according to claim 1, wherein the intermediate plate includes stepped portions (13) having a stepped portion height approximately two times larger than a stepper height.

8. The metal gasket according to claim 7, wherein the stepped portion height is smaller than a sum of heights of the stoppers (9) and each of the beads (4).

9. The metal gasket according to claim 1, wherein a stopper height (E) is less than a bead height and the intermediate plate thickness, and less than an auxiliary bead height.

* * * * *